United States Patent [19]

Legare

[11] Patent Number: 5,035,094
[45] Date of Patent: Jul. 30, 1991

[54] NESTED EXTENSION/RETRACTION STRUCTURE AND METHOD OF FABRICATION

[76] Inventor: David J. Legare, 11 Bonnie Ave., New Hartford, N.Y. 13413

[21] Appl. No.: 498,624

[22] Filed: Mar. 26, 1990

[51] Int. Cl.$^5$ .......................... B66C 5/08; B66C 13/22
[52] U.S. Cl. ........................................ 52/118; 52/111; 52/632; 343/903
[58] Field of Search .................... 52/111, 118, 632; 343/901, 903; 248/404, 405

[56] References Cited

U.S. PATENT DOCUMENTS

| | | | |
|---|---|---|---|
| 4,062,156 | 12/1977 | Roth | 52/111 |
| 4,542,383 | 9/1985 | Casey et al. | 343/903 |
| 4,594,824 | 6/1986 | Ziegler et al. | 52/118 |
| 4,871,138 | 10/1989 | Sauter | 52/118 X |

FOREIGN PATENT DOCUMENTS

| | | | |
|---|---|---|---|
| 904530 | 7/1972 | Canada | 52/632 |
| 2405711 | 8/1974 | Fed. Rep. of Germany | 52/118 |
| 1592492 | 7/1981 | United Kingdom | 52/118 |

Primary Examiner—Richard E. Chilcot, Jr.
Assistant Examiner—Kien T. Nguyen
Attorney, Agent, or Firm—Charles S. McGuire

[57] ABSTRACT

An axially extensible and retractable structure including a plurality of cylindrical, threadedly engaged elements rotatable relative to one another for movement between axially extended and retracted positions together with a plurality of non-rotatable, telescoping segments. Preferably, none of the threads is exposed on the outside of the structure as the elements are moved between their extended and retracted positions. The structure is described in several embodiments, some with the telescoping segments positioned within the threaded elements, and some with the threaded elements within the segments which, in one embodiment, is adapted to support another element such as a boat sail, along its axial length. Also disclosed is a preferred method for fabricating the threaded elements utilizing relatively strong, light-weight materials such as carbon fiber impregnated with a curable epoxy resin.

12 Claims, 6 Drawing Sheets

NESTED EXTENSION/RETRACTION STRUCTURE AND METHOD OF FABRICATION

BACKGROUND OF THE INVENTION

The present invention relates to multi-section, screw-type mechanisms movable between extended and retracted positions, and to methods of fabrication thereof. More specifically, the invention is concerned with novel and improved appartus for moving telescopically nested elements between an extended position for use in an intended application, and a retracted position, up to several times less than the fully extended length, depending on the number of telescoping elements employed, for storage and/or transport and to novel methods of fabrication of such apparatus.

Many types of towers are used by both the military and civilian sector to support mobile radio, lighting, and sensor systems, and to provide an emergency reaction capability for such applications as restoring power lines downed by a natural disaster. In general, these structures either consist of segments which are assembled horizontally on the ground and then hoisted to a vertical position, or telescoping sections which are extended vertically using hydraulic or pneumatic power, or various types of winch mechanisms which operate in a manner similar to an extension ladder. The latter technique is most commonly employed on truss-type towers. These are generally very complex and bulky because of the large numbers of individual bolted or welded pieces which form the truss structuring of the mast sections, and because of the extensive cabling and pulleys which must be employed to raise and lower the tower.

Hydraulic and pneumatic systems are generally used with masts composed of telescoping tubular segments. A hydraulic lifting system would normally be incorporated inside the structure as a separate set of fluid-drived, tubular segments. A pneumatic system can simplify the design because the mast segments themselves can be directly inflated to provide extension, assuming the segments fit closely together and are properly sealed to prevent air leakage. In spite of its simplicity, a major drawback of the pneumatic approach is its vulnerability to catastrophic failure caused by the rupture of a seal or a simple puncture of the tube wall. This is of particular concern when the structure is in a hostile military environment, or in a remote location where it might be punctured by small arms fire as the object of vandalism or target practise.

It should also be noted that the foregoing mechanisms do not provide a means of producing a retracting force to lower the tower. Therefore, if gravity is insufficient to pull down the tower segments because of wind loading (which increases the sliding friction between the tower segments) or ice build-up between the segments, the tower cannot be lowered. The method described by this invention eliminates these problems by allowing an equally powerful pull-down (retracting) force to be applied with no additional hardware or system complexity. It is obvious that this feature is a necessity for structures which are intended to operate in orientations other than essentially vertical.

Nested, telescoping structures have also been provided wherein relative axial movement of a plurality of sections is provided by mutually engaged, helical screws. Such structures have generally been limited to relatively small-scale, heavy lifting applications, such as automobile jacks, intended for a range of extension and retraction on the order of 8 to 24 inches, as typefied by those shown in U.S. Pat. Nos. 1,593,217, issued July 20, 1926 to Lucker, and 2,069,012, issued Jan. 26, 1937 to Lynes. The jacks of these patents each include either two or three tubular members having external threads over their entire length engaged with internal threads extending for a portion of the length of the circumferentially adjacent member. The threaded, tubular members are surrounded by non-rotatable, unthreaded, telescoping sections which are axially movable with the threaded members between their relatively extended and retracted positions. Such screwjacks have been largely supplanted for automative use by ratchet-type jacks or, in heavier duty applications, by hydraulic jacks, since modern technology has made these alternatives cheaper and easier to implement for small structures such as a car jack.

It is a principal object of the present invention to provide an axially extensible and retractable mechanism including a plurality of mutually telescoping, threaded members wherein the design is optimised for large-scale applications.

Another object is to provide an axially extensible and retractable structure having a plurality of nested, helically threaded segments wherein no threads are externally exposed in any position of the structure without requiring any elements surrounding the threaded segments.

A further object is to provide a tower or mast structure movable between relatively extended and retracted positions by relative rotation of threadedly engaged members with improved means for effecting electrical connection to a payload supported upon and movable with the structure.

Another object is to provide a novel and improved, vertically extensible and retractable sail boat mast.

Another object is to provide a novel and improved extendable and retractable boom structure which can be positioned at any angle between 0 to 90 degrees.

Still another object is to provide for the use of high strength, low weight materials such as carbon and/or Kevlar reinforced epoxy composites in the fabrication of the above structure.

Other objects will in part be obvious and will in part appear hereinafter.

SUMMARY OF THE INVENTION

In accordance with the foregoing objects, the invention contemplates a screw-type, axially extensible and contractable structure including a plurality (at least two, but in most applications three or more) of hollow, cylindrical, telescoping members, all but the innermost of which are internally threaded over substantially their entire length, from one end to an internal stop means adjacent the other end. Also, all except the outermost of the telescoping members have external threads extending from one end for a portion, in most cases less than 1/10, of the total axial length of the member. The stop means may comprise a lip extending inwardly around the end of each member opposite the end having the external threads. The lip may have an axial length on the order of that of the external threads, if desired, and engage the adjacent inner member snugly to provide lateral support and prevent Euler buckling when the members are extended.

Means are provided to effect relative rotation of the members, thereby moving the members axially between the extended and retracted positions as the external threads on each member within the outermost member travel along the internal threads of the outwardly adjacent member. Such means may comprise an electric motor mounted to effect reciprocal rotation of the outermost member and further means for restraining rotation of the inner members with respect to the outermost members. The means for restraining relative rotation may comprise conventional means such as splines, keyways, and the like, or a non-rotatable, multi-segment, telescoping structure affixed to one or more of the threaded, axially-movable elements.

The invention is illustrated and described in some embodiments wherein the threaded members are arranged for vertical axial movement, although it is not limited to such applications. In one illustrated embodiment, a payload is supported on the upper end of the innermost threaded member which is fixedly attached to the upper end of a non-rotatable, multi-segment, telescoping structure which is axially movable between extended and retracted positions together with the threaded members. The telescoping structure is substantially entirely disposed within the innermost threaded member (having external, but not internal threads) in the fully retracted position. In addition to providing lateral support and the means for restraining relative rotation of the threaded members, the telescoping structure is hollow and provides a shielded passageway for a flexible cable. The payload may comprise a piece of electrical or electronic apparatus with the flexible cable providing a power, ground, or other electrical connection to such apparatus.

In other illustrated embodiments, the threaded members are surrounded by a non-rotatable, multi-segment, telescoping structure which is connected to and axially movable with the threaded members between extended and retracted positions. In one such embodiment, this external, non-rotating telescoping structure serves as a retractable aircraft wing, or the like. In another implementation, an open, axially extending slot is formed in each segment of the telescoping structure to provide a continuous, open slot extending the full length of the structure in its extended position. Such a mechanism may be advantageously employed as a collapsible sailboat mast with the sail engaged in the slot of the telescoping structure, and a flexible cable for hoisting and lowering the sail extending through the space between the exterior of the threaded members and the interior of the telescoping structure.

The invention is also concerned with novel, preferred methods and materials used in the fabrication of the threaded members. The members are preferably fabricated from plastics and/or composite materials of low weight and high strength, such as Kevlar and carbon or graphite plastic composites. A flexible material, such as carbon, Kevlar, or glass fiber cloth strip may be impregnated with an uncured plastic resin such as epoxy or styrene and wound on an externally threaded mandrel. The material is first wound to fill in the thread gap and then over the entire surface of the mandrel to form a smooth cylindrical outer surface. Upon curing, with the application of heat, if necessary, a rigid structure is formed and the mandrel is removed by unscrewing from the internal threads thus formed in the hardened material wound thereon. A separately fabricated, externally threaded sleeve is secured over one end of the hollow tube to provide the portion which threadedly engages the adjacent, mating, threaded member in the fully assembled structure. The internal lip at the other end of the tube could be likewise separately fabricated and attached, or formed in one step as part of the tube.

The foregoing and other features of the invention will be more readily understood and appreciated from the following detailed description, taken in conjunction with the accompanying drawings.

DETAILED DESCRIPTION

Figure 1:
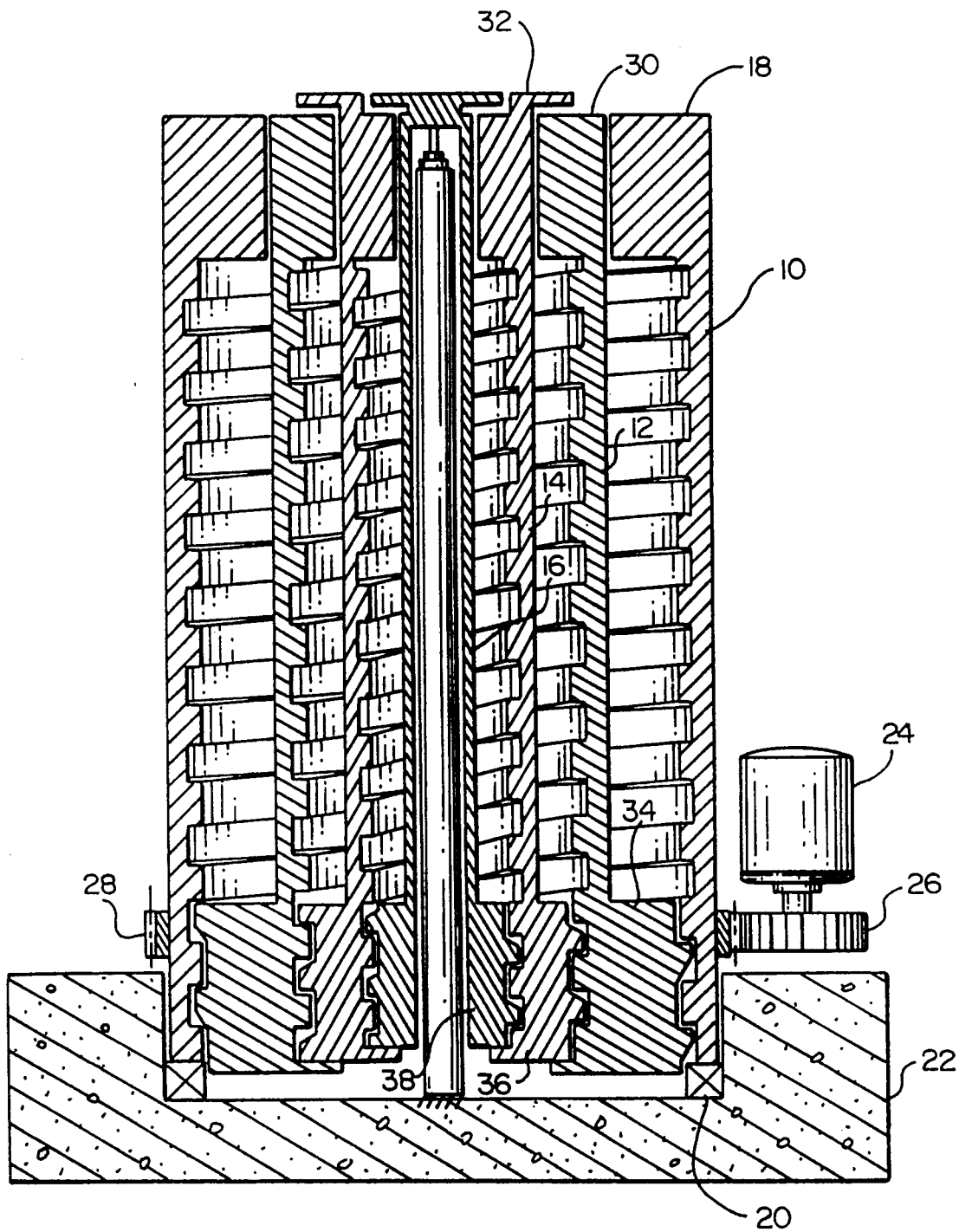
FIG. 1 is an elevational view in vertical section of a first embodiment of the invention, with the elements shown in the fully retracted position.
Figure 2:
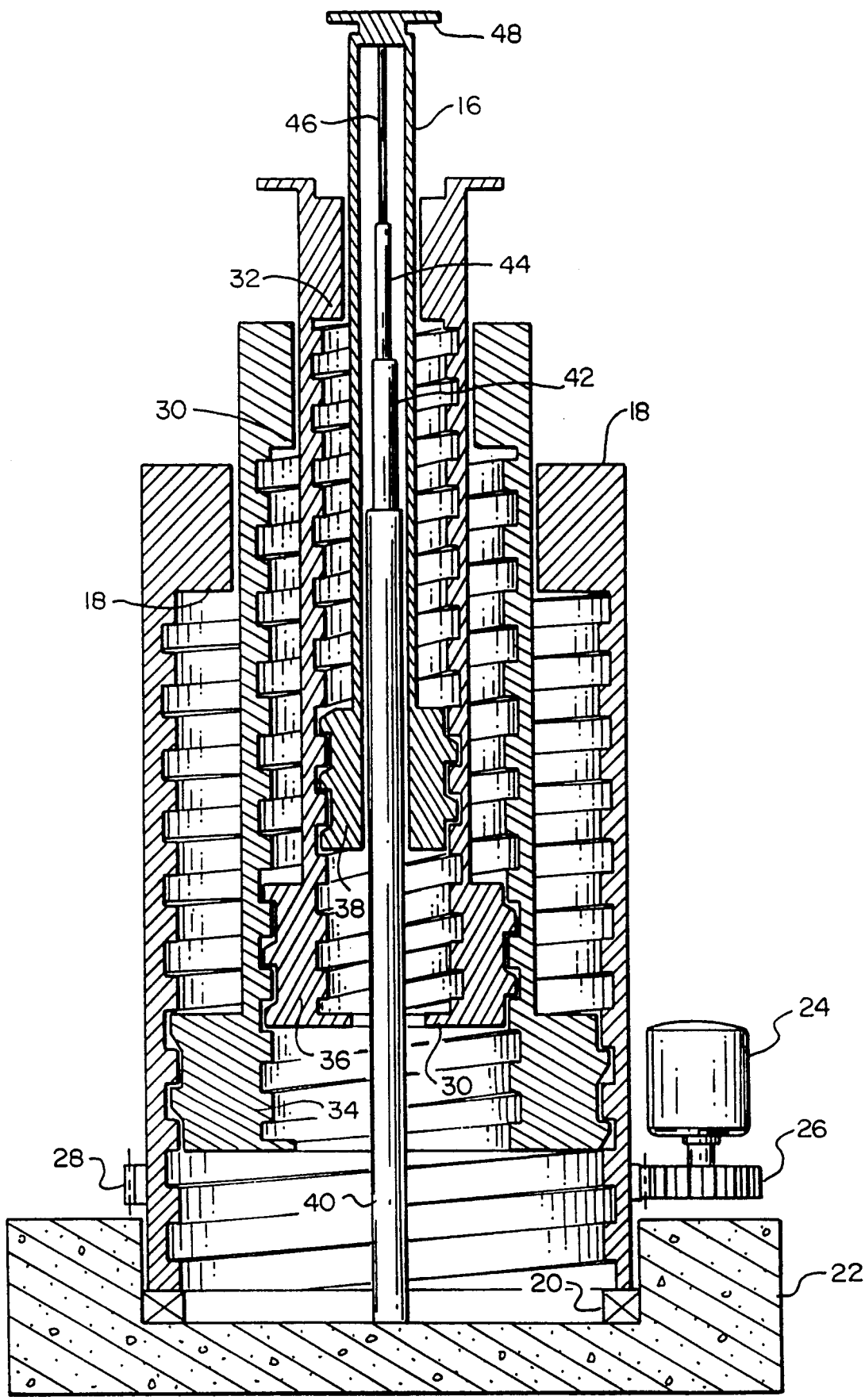
FIG. 2 is an elevational view, in section, showing the elements of FIG. 1 in partly extended positions.
Figure 3:
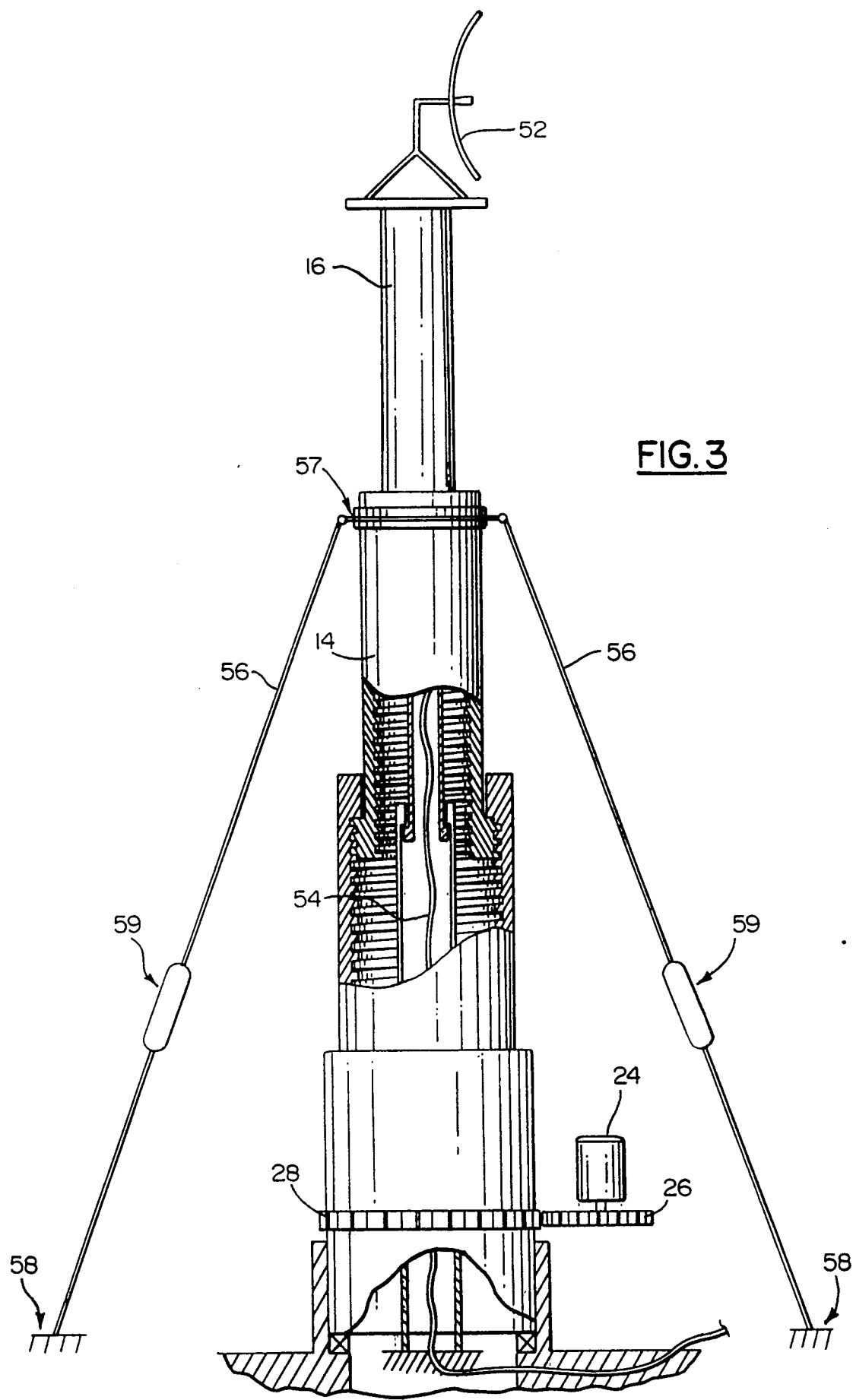
FIG. 3 is an elevational view, partly in section, showing the elements of FIGS. 1 and 2 in the fully extended position with a payload supported thereon.

Referring now to the drawings, in FIGS. 1-3 is seen a first embodiment of the invention including a plurality of hollow, cylindrical elements, arranged concentrically about a central axis, and denoted by reference numerals 10, 12, 14 and 16. The elements are illustrated with the central axis in a vertical orientation, and the elements will be described for convenience in embodiments so oriented as having upper and lower ends. Although the structure will be vertically oriented in many practical applications, it will be understood that the invention is not limited to employment in a vertical orientation. It is also pointed out that the drawings are not in scale, being generally exaggerated in the horizontal direction for a clearer showing of the relationship of certain parts. Actual dimensions, including overall length, diameter, thread pitch length, and depth, number of segments, etc. will be dictated by the intended application, including anticipated longitudinal and lateral loads, operating environment, and the like. It is furthermore noted that although the illustrated structures include three or four threaded elements it is clear that any of these structures could be built to incorporate any practical number of extandable/retractable elements using the basic design concepts illustrated.

Outermost element 10 is helically threaded over its internal surface from its lower end to internally projecting lip 18 adjacent its upper end. In the illustrated embodiment, the lower end of element 10 rests upon bearings 20 in stationary base 22. Element 10 is reciprocally rotatable by electric motor 24, fixedly supported from base 22 to rotate gear 26 which is engaged with gear teeth 28 encircling the outer surface of element 10.

Elements 12 and 14 are likewise helically threaded on their internal surfaces from their lower ends to internally projecting lips 30 and 32, respectively, adjacent their upper ends. Innermost element 16 does not include such internal threads.

Element 12 includes structure 34 defining external threads extending from its lower end for a portion of its length (about 1/6 in the illustrated embodiment). Likewise, elements 14 and 16 include structure 36 and 38, respectively, providing external threads at their lower ends. The external threads of element 12 are engaged with the internal threads of element 10. Thus, rotation of element 10 will cause relative axial movement of these elements. Likewise, relative rotation of elements 12 and 14, and elements 14 and 16, will produce relative axial movement of these elements. The entire structure may therefore be moved between fully extended and retracted positions by relative rotation of the threaded elements.

Innermost element 16 is hollow, like the other elements, and provides a passageway for a non-rotatable, telescoping structure formed of multiple, concentric sections 40, 42, 44 and 46. Outermost section 40 is fixedly attached at its lower end to base 22, and innermost section 46 is affixed at its upper end to cap 48 of element 16. Sections 42 and 44 are longitudinally slidable but not rotatable, with respect to one another and with sections 40 and 46, by keyways, detents, or other such conventional means (not shown), or simply by having a non-circular cross section. Thus, as element 16 moves axially with respect to the other threaded elements, it is restrained from rotation by its connection to section 46 of the non-rotatable, telescoping structure. Likewise, the telescoping sections are moved axially between extended and retracted positions through the corresponding movement of the threaded elements.

The structure is shown in FIG. 2 with each of the threaded elements, as well as the telescoping sections, in intermediate relative positions. Depending on the type of mechanism used to restrain relative rotation of the threaded elements, extension and retraction may take place in any sequence, although under most conditions the elements will be fully extended and retracted in sequence rather than the partial simultaneous extension of each element, as shown in FIG. 2 for ilustrative purposes only. In fact, extension and retraction may be effected by imparting rotation to one of the threaded elements other than the outermost section and restraining rotation of the other elements with respect to the rotated element.

Since the innermost element 16 is fixedly attached at its upper end to the non-rotatable telescoping structure, the external threads on structure 38 will travel up the internal threads of element 14 upon rotation in the proper direction of outermost element 10, assuming the rotation is also imparted to elements 12 and 14 through frictional engagement of the threads. When element 16 reaches the limit of its upward travel, the upper end of structure 38 will contact the lower surface of stop means 32. The frictional engagement of these contacting surfaces then serves to restrain rotation of element 14 relative to element 12 and the external threads on structure 36 will travel up the internal threads of element 12. Likewise, when element 14 reaches the upper limit of its travel, frictional engagement of the upper surface of structure 36 with the lower surface of stop means 30 will restrain rotation of element 12 relative to element 10, thereby producing extension of element 12 upon continued rotation of element 10.

Retraction of the elements results in similar fashion by rotation of outermost element 10 in the opposite direction. Again, rotation of inner element 16 is restrained by its attachment to telescoping section 46. Downward movement of element 16 is stopped by contact of flange 48 on the upper end thereof with the upper end of element 14 and/or contact of the lower surface of structure 38 with flange 50 at the lower end of element 14. Rotation of element 14 is then restrained by frictional engagement with element 16 and the external threads on structure 36 will then travel down the internal threads of element 12. Continued rotation of outermost element 10 will result in full retraction of the mechanism to the FIG. 1 position. If desired, positive engagement means may be provided on the elements to restrain relative rotation, rather than relying upon frictional engagement.

In FIG. 3 is shown a practical application of the invention wherein a payload is supported on the upper end of element 16. The payload may comprise a piece of electrical or electronic equipment, such as the illustrated antenna 52, a beacon light, or any other such apparatus. The hollow, telescoping sections may then serve the further purpose of providing an enclosed passageway for flexible cable 54, providing power, signal and/or grounding connection to the electrical apparatus supported on the extensible/retractable mechanism. Also shown in FIG. 3 are guywires 56, one end of each being attached to floating collar 57 which can independently rotate relative to the tower segment 14. The other ends of guy wires 56 are attached to ground anchor points 58 while the tower is in the retracted position. Slack in the wires can be taken up by spring loaded spools 59 from which the wire is pulled as the tower is raised to its fully extended position. The floating collar 57 thus prevents the wires from twisting around the rotating segment 14 as the tower is raised. The wire is fully unwound from the spools 59 when the tower is fully extended. A turn buckle or other means (not shown) can be used to provide further tension to the guy wires, if desired.

Figures 4, 5, 6:
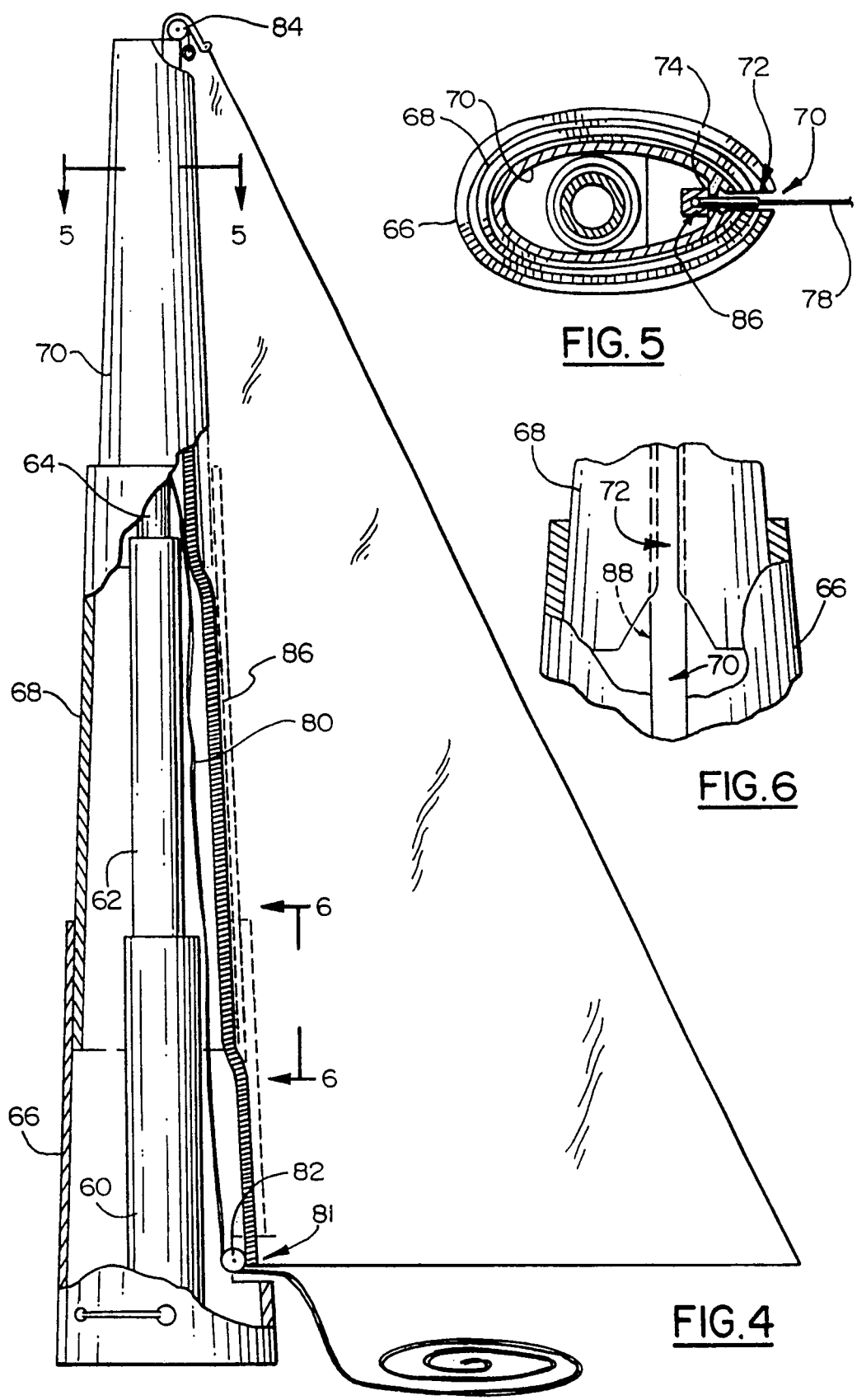
FIG. 4 is an elevational view, partly in section, showing a second embodiment of the invention.
FIG. 5 is a plan view in section on the line 5—5 of FIG. 4.
FIG. 6 is a fragmentary, elevational view as seen generally from the position indicated by line 6—6 of FIG. 4.

Turning now to FIGS. 4-6, the structure of the invention is shown in an embodiment wherein the telescoping segments are positioned externally of the rotatable, threaded elements. The structure, arrangement and operation of the threaded elements, numbered 60, 62 and 64, is the same as in the previously described embodiment, relative rotation of the elements for extension and retraction being provided by externally powered or manual means. Telescoping segments 66, 68 and 70 are non-circular, as best seen in the sectional plan view of FIG. 5, and thus cannot rotate relative to one another. Segment 66 is fixedly attached to the underlying support, and segment 70 is attached at its upper end to the upper end of threaded element 64, thereby also restraining rotation of this element and permitting full extension and retraction by rotation of elements 60 and 62.

Aligned, open slots 72, 74 and 76 extend axially the full length of each of segments 66, 68 and 70. Such slots provide for the attachment to the structure, and support thereby, of one or more other members such as the illustrated boat sail 78. Rope or line 80 passes through an enlarged portion 81 at the lower end of slot 70 and around pulleys 82 and 84, respectively affixed to segments 66 and 70. One end of line 80 is attached to an eye, grommet, or other attachment means at the top of sail 78, which may be hoisted when the extensible and retractable structure is in its fully extended position.

A hem, bead or other such structure, having a width greater than that of slots 72, 74 and 76 extends along one edge 86 of sail 78. The end of edge 86 adjacent the attachment of line 80 may be fed through enlarged portion 81 of slot 70 as the lower end of line 80 is pulled to hoist the sail. The lower ends of slots 74 and 76 may be widened, as indicated at 88 in FIG. 6, to facilitate entry of the upper portion of the sail into the lower ends of these slots as the sail is hoisted. An appropriate boom (not shown) may be attached to the lower end of segment 66 to extend along the lower edge of sail 78, and other accessories and the like may be conveniently supported by the structure.

Figure 7:
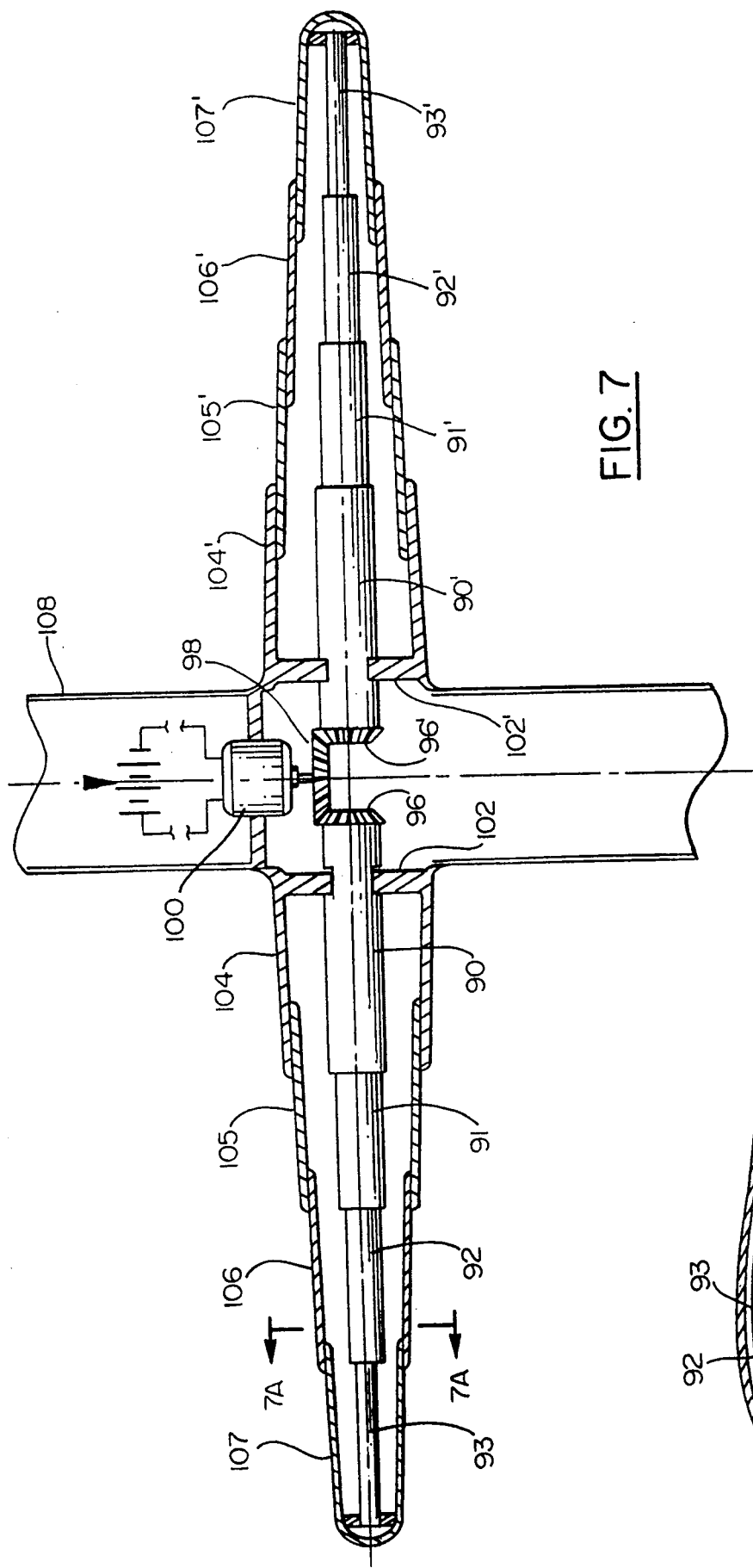
FIG. 7 is a somewhat diagrammatic, elevational view, in section, of another embodiment of the invention, with the elements in the fully extended position.
Figure 7A:
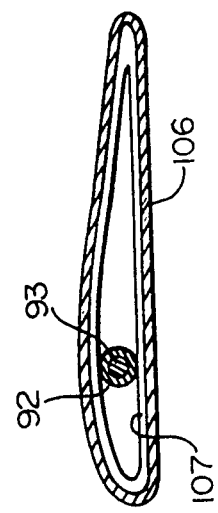
FIG. 7a is an elevational view in section on the line 7a—7a of FIG. 7.

The invention is shown in FIG. 7 in still another useful application. Two, axially aligned sets of threaded elements, each surrounded by a like number of non-rotatable, telescoping segments, are mounted for simultaneous extension and retraction in opposite directions. Threaded members 90, 91, 92 and 93 are arranged for extension from right to left, and members 90', 91', 92' and 93', from left to right, in the illustrated orientation. The threaded elements are internally the same as those of the previous embodiments. The inner, opposing ends of members 90 and 90' are provided with integrally formed or fixedly attached bevel gears 96 and 96', each of which meshes with bevel gear 98, driven by a single, reversible motor 100, although separate drive means could be provided. Members 90 and 90' are rotatably supported by journals 102 and 102', respectively, which may be fitted with bearings, if desired.

Threaded members 90-93 are surrounded by non-rotatable, telescoping segments 104, 105, 106 and 107; likewise, members 90'-93' are surrounded by telescoping segments 104', 105', 106' and 107'. The outer ends of threaded members 93 and 93' are fixedly attached to telescoping segments 107 and 107', whereby the outer threaded members are non-rotatable, providing relative rotation, and axial extension and retraction of the threaded members. Embodiments such as that of FIG. 7 may be advantageously employed in applications involving axially extensible and retractable aircraft wings, shown attached to a portion of fuselage 108. In such applications, segments 104-107 and 104'-107' would be provided with appropriate aerodynamic configurations and any required structural support. Aircraft of this type could be, for example, small, pilotless drones, or the like, to be carried by and launched from larger craft.

A preferred method of fabrication of the threaded members employed in the invention will now be discussed. Preferred materials for construction of the threaded members are relatively light weight, high strength plastics and composite materials such as carbon and/or Kevlar epoxy composites. Continuous strips of fiber cloth (e.g., carbon fiber) may be pre-impreganted in known manner with an uncured plastic resin (e.g., epoxy resin) and wound onto an aluminum mandrel whose surface has been pre-coated with release agents to facilitate subsequent removal of the cured rigid structure from the mandrel. Several pre-impregnated fiber layers are thus typically applied to create the desired thickness and strength properties of the finished product. It is noted that each layer may be applied in a different direction or orientation relative to the other layers, and that different types of fiber layers may be alternately applied in order to selectively strengthen the structure in any desired direction. When heat-processing is used to cure the structure, a heat-shrinkable plastic layer may be applied over the pre-impregnated fiber layers. Thus, the combination of compression by the heat shrink layer and expansion of the aluminum mandrel during heating helps to fuse the fiber layers together as the plastic resin cures and hardens. After cooling, the aluminum mandrel contracts while the composite structure retains its cured shape, thus facilitating its removal from the mandrel.

Figure 8:
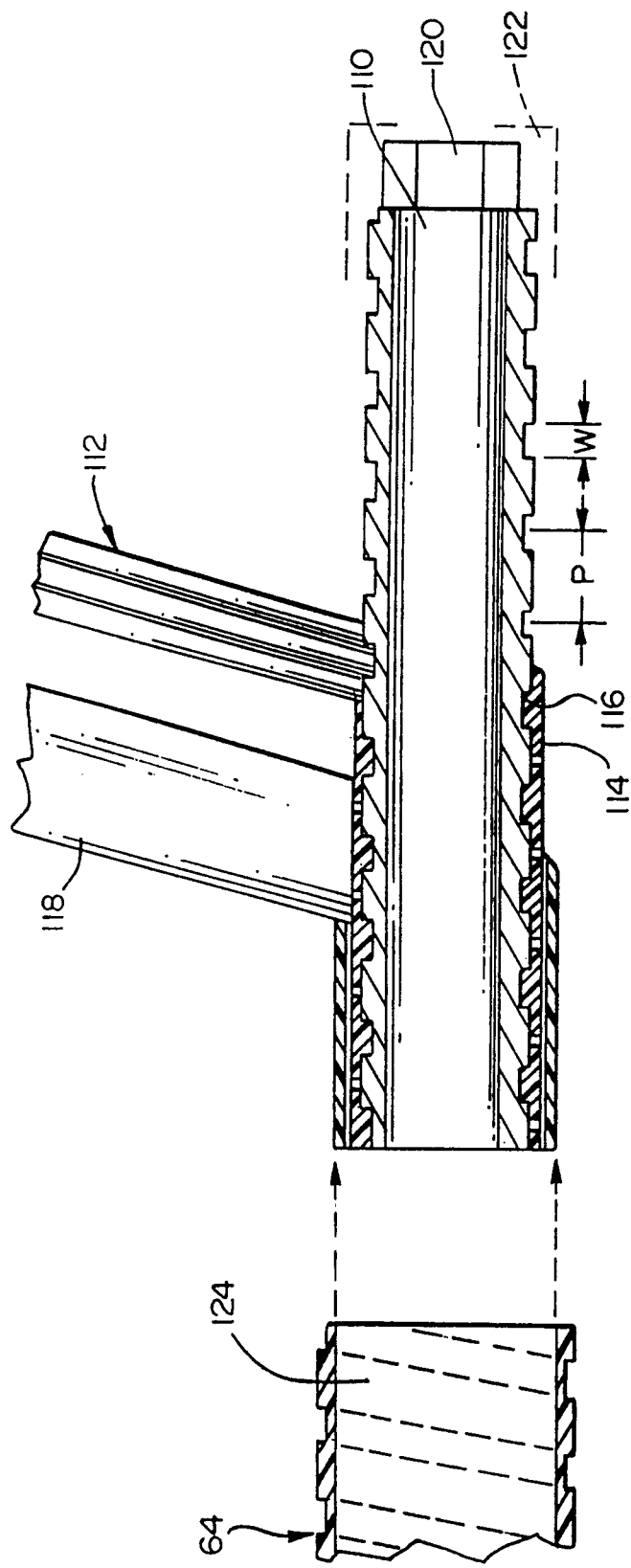
FIG. 8 is a somewhat diagrammatic view, in section, illustrating a preferred method of fabrication of the threaded members employed in the invention.

In the example of the preferred fabrication method illustrated in FIG. 8, cylindrical mandrel 110 is formed with external, helical threads having a configuration corresponding to the desired internal threads of the member to be fabricated, i.e., a square profile thread having a pitch and depth of, e.g., about one inch and 1 or 2 mm, respectively. A suitable, pre-impregnated fiber layer 112, is wound tightly on mandrel 110. Fiber layer 112, in the illustrated form, includes a first portion 114 having a width equal to the pitch P of the threads on mandrel 110, and a second portion 116 extending centrally from one side of the first portion and having a width W equal to the width of the threads, and a thickness T equal to the thread depth. Layer 112 is wound in a helical path on mandrel 110 so that second portion 116 fills the indentations, and first portion 114 forms a continuous layer having a smooth outer surface upon the portions between the indentations in the mandrel. Although not shown, it is noted that portion 116 could be used alone without portion 114, and could furthermore consist of one or more layers of pre-impregnated fiber wound consecutively to fill the indentations. It is also noted that layer 112 could either be a single, pre-impregnated fiber layer, or simply a solid flexible strip material such as plastic or aluminum.

One or more additional fiber layers 118 may then be successively wound upon the outer surface of layer 112, and upon one another to form a wall providing the thickness and strength characteristics desired for the threaded element to be used in the extensible/retractable structure of the invention. The material is then cured, which may require application of heat and/or inwardly directed pressure (e.g., by the aforementioned heat-shrinkable, plastic covering) depending on the type of material used and the desired characteristics of the end product. After the material has cured, mandrel 110 may be removed simply by unscrewing it from engagement with the internal threads thus formed in the rigid, hollow element.

The external dimensions and configuration of mandrel 110 are, of course, selected to conform to the desired internal configuration of the rigid element to be formed thereon. Therefore, a different mandrel would be used for the fabrication of each threaded element to be used in a particular expansible/retractable structure. It will be noted that mandrel 110 of FIG. 8 has a reduced diameter portion 120 at one end. This permits pre-impregnated fiber layers to be wound on portion 120 to form lip portion 122, corresponding to lip portions 18, 30 and 32 of threaded elements such as elements 10, 12 and 14 of FIGS. 1-3. For those elements having an externally threaded portion, such as portions 34, 36 and 38 of elements 12, 14 and 16, respectively, of FIGS. 1-3, portion 124 (FIG. 8) may be separately fabricated by similar (or other) techniques and securely attached by adhesive or other suitable means to the exterior of the element formed on mandrel 110. An element such as 10 would, of course, not require the attachment of an externally threaded portion, and elements such as 16 would require no internal threads. It is also contemplated that, with appropriate techniques, the portion providing the external threads could be formed by winding pre-impregnated fiber layers directly upon the outer surface of the internally threaded portion, either before or after mandrel 110 is removed. One method of forming the external threads could be to simply cut the threads using a lathe or other means after the entire structure is fully hardened.

From the foregoing it may be seen that the invention provides extensible/retractable structures useful in a variety of applications over a wide range of extended and retracted lengths. The invention also provides a preferred method of fabrication of the threaded elements of such structures, permitting construction of relatively light weight structures having suitable strength properties for use in applications requiring an extended length of 100 feet, or more. It is estimated that the use of modern composite materials such as carbon and Kevlar epoxy composites will allow the practical implementation of this invention for structures such as 100 foot radio towers using threaded members which are 8 inches or less in diameter with a wall thickness on the order of only a few millimeters. The total weight of the threaded members in such a structure would be only about 150 to 300 lbs., while providing sufficient rigidity to support equipment such as a microwave radio system while sustaining only a slight angular deflection even under relatively heavy wind loading.

It can be readily seen that a boom structure formed by the invention could find a number of additional uses in space, where these wind loading and gravitational forces no longer exist. The use of the same composite materials could therefore provide structures of the same length with an order of magnitude or more reduction in weight. Ultra-light weight, space deployable structures consisting of up to 10 or more concentric, telescoping members which are extremely compact when stored, and which can extend to hundreds of feet in length, are therefore easily conceivable. The simplicity and reliability inherent in the design of the invention would also make this type of structure well suited for use in satellites and other orbiting space platforms. Thus, it can be seen that the invention has a number of unique, diverse applications.

What is claimed is:

1. A telescoping, axially extensible and retractable structure comprising:
   a) a first, hollow, tube-like member having internal and external walls and elongated on a central axis between first and second ends;
   b) first stop means extending inwardly from said internal wall of said first member adjacent said first end;
   c) means defining a first, helical thread on said internal wall of said first member extending substantially from said second end to said first stop means;
   d) a second, hollow, tube-like member, positioned at least partially within said first member, having internal and external walls and elongated on said central axis between third and fourth ends;
   e) means defining a second, helical thread on said external wall of said second member extending substantially from said fourth end to a predetermined position less than half the distance to said third end, said first and second threads being mutually engaged for relative axial movement of said first and second members in response to relative rotation thereof;
   f) second stop means extending inwardly from said external wall of said second member adjacent said predetermined position; and
   g) means for effecting relative rotation of said first and second members to produce said relative axial movement thereof between a relatively retracted position, wherein said second and fourth ends are substantially adjacent one another, and a relatively extended position, wherein said first and second stop means are in mutual contact, whereby both said first and second threads remain externally unexposed throughout the range of said relative axial movement of said first and second members.

2. The invention according to claim 1 and further comprising:
   a) third stop means extending inwardly from said internal wall of said second member adjacent said third end;
   b) means defining a third, helical thread on said internal wall of said second member extending substantially from said fourth end to said second stop means;
   c) a third, tube-like member, positioned at least partially within said second member, having an external wall and elongated on said central axis between fifth and sixth ends;
   d) means defining a fourth, helical thread on said external wall of said third member extending substantially from said sixth end to a fixed position less than half the distance to said fifth end, said third and fourth threads being mutually engaged for relative axial movement of said second and third members in response to relative rotation thereof;
   e) fourth stop means extending inwardly from said external wall of said third member adjacent said fixed position; and
   f) means for effecting relative rotation of said second and third members to produce said relative axial movement thereof between a relatively retracted position, wherein said fourth and sixth ends are substantially adjacent one another, and a relatively extended position, wherein said second and third stop means are in mutual contact, whereby both said third and fourth threads remain externally unexposed throughout the range of said relative axial movement of said second and third members.

3. The invention according to claim 2 and further including a payload supported upon said fifth end.

4. The invention according to claim 3 wherein said central axis is substantially vertical, whereby said payload is moved between lowered and raised positions during said relative axial movement of said first, second and third members.

5. The invention according to claim 4 and further including means defining an internal passageway extending between said fourth and fifth ends, and a flexible cable extending through said passageway.

6. The invention according to claim 5 wherein said payload comprises electrical apparatus and said cable effects an electrical connection to said electrical apparatus.

7. The invention according to claim 1 wherein said first member is reciprocally rotatable, and further comprising means for restraining rotation of said second member.

8. The invention according to claim 7 and further comprising a multi-segment, telescoping tube, elongated on said central axis, extending between a fixed end and a movable end, and further including means connecting said movable end to said third end.

9. The invention according to claim 8 wherein said tube is non-rotatable, and said means for restraining rotation of said second member comprises said tube and the connection of said movable end thereof to said third end.

10. The invention according to claim 9 and further including a flexible cable extending through said tube.

11. The invention according to claim 10 wherein said tube is positioned substantially entirely within said second member when said first and second members are in said relatively retracted position.

12. The invention according to claim 10 and further including electrical apparatus supported on and movable with said movable end of said tube, and wherein said cable provides an electrical connection to said electrical apparatus.

* * * * *